May 6, 1969   R. L. COHEN   3,443,073
GROUNDSPEED AND ESTIMATED TIME OF ARRIVAL COMPUTER
Filed Jan. 21, 1964   Sheet 1 of 3

INVENTOR.
RICHARD L. COHEN
BY
ATTORNEY

INVENTOR.
RICHARD L. COHEN
BY
ATTORNEY

INVENTOR.
RICHARD L. COHEN

United States Patent Office 3,443,073
Patented May 6, 1969

3,443,073
GROUNDSPEED AND ESTIMATED TIME
OF ARRIVAL COMPUTER
Richard L. Cohen, Brooklyn, N.Y., assignor to The Bendix
Corporation, Teterboro, N.J., a corporation of Delaware
Filed Jan. 21, 1964, Ser. No. 339,254
Int. Cl. G06f 15/50; G06g 7/78
U.S. Cl. 235—150.2
9 Claims

ABSTRACT OF THE DISCLOSURE

A device for indicating groundspeed and estimated time of arrival of a craft at a destination comprising an averaging device for averaging the speed of the craft during a distance increment and periodically correcting the average speed during succeeding distance increments.

---

The present invention relates to a groundspeed and estimated time of arrival computer for aircraft.

A highly accurate prediction of estimated time of arrival is only possible if a computer adjusts for changes in groundspeed of an aircraft. However, basing a computation on groundspeed of an aricraft at a particular instant is subject to large error, as the groundspeed of an aircraft fluctuates over a wide range from instant to instant.

Briefly, the present invention comprises a computer for accurately predicting estimated time of arrival from groundspeed and distance to go information derived from conventional Tacan distance measuring equipment. The prediciton is based on average groundspeed over a five mile increment. At ten mile increment, the computer adjusts its groundspeed determination to correspond with its average groundspeed over the five mile increment most recently traversed. Thus, the computer adjusts for changes in groundspeed, and since this adjustsment is based on changes in average groundspeed over five mile increments, rather than an instantaneous determination of groundspeed, a highly accurate determination of estimated time of arrival is obtained. Moreover, since the computer is used in conjunction with conventional Tacan distance measuring equipment, which is presently in wide use, it is easily adapted to present systems and its size and weight are minimized.

An object of the present invention is to provide an aircraft with a computer capable of predicting estimated time of arrival information with a high degree of accuracy.

Another object of the present invention is to provide a computer capable of predicting estimated time of arrival including means for compensating for changes in groundspeed.

Another object of the present invention is to provide apparatus for computing groundspeed and estimated time of arrival from information derived from conventional Tacan distance measuring equipment.

Another object of the present invention is to provide a computer for an aircraft for predicting estimated time of arrival including a continuously driven motor, a potentiometer, a novel mechanical memory for coupling the motor to the potentiometer including a magnetic brake, a magnetic clutch, reset springs and a one-way drive connection, and a novel switching circuitry for controlling the energization of the magnetic brake and magnetic clutch to adjust the output of the potentiometer as a function of the groundspeed of the aircraft.

Another object of the present invention is to provide a computer as described in the preceding paragraph, wherein the switching circuitry is responsive to null signals derived from the unit's distance transmitter in conventional Tacan distance measuring equipment, the null being derived at each 180° interval of rotation of the rotor of the units distance synchro which corresponds to a distance of five miles.

Another object of the present invention is to provide a computer as described in the preceding paragraph, wherein varying increments of rotation of the rotor of the unit's distance synchro for a given distance travelled, are averaged out.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
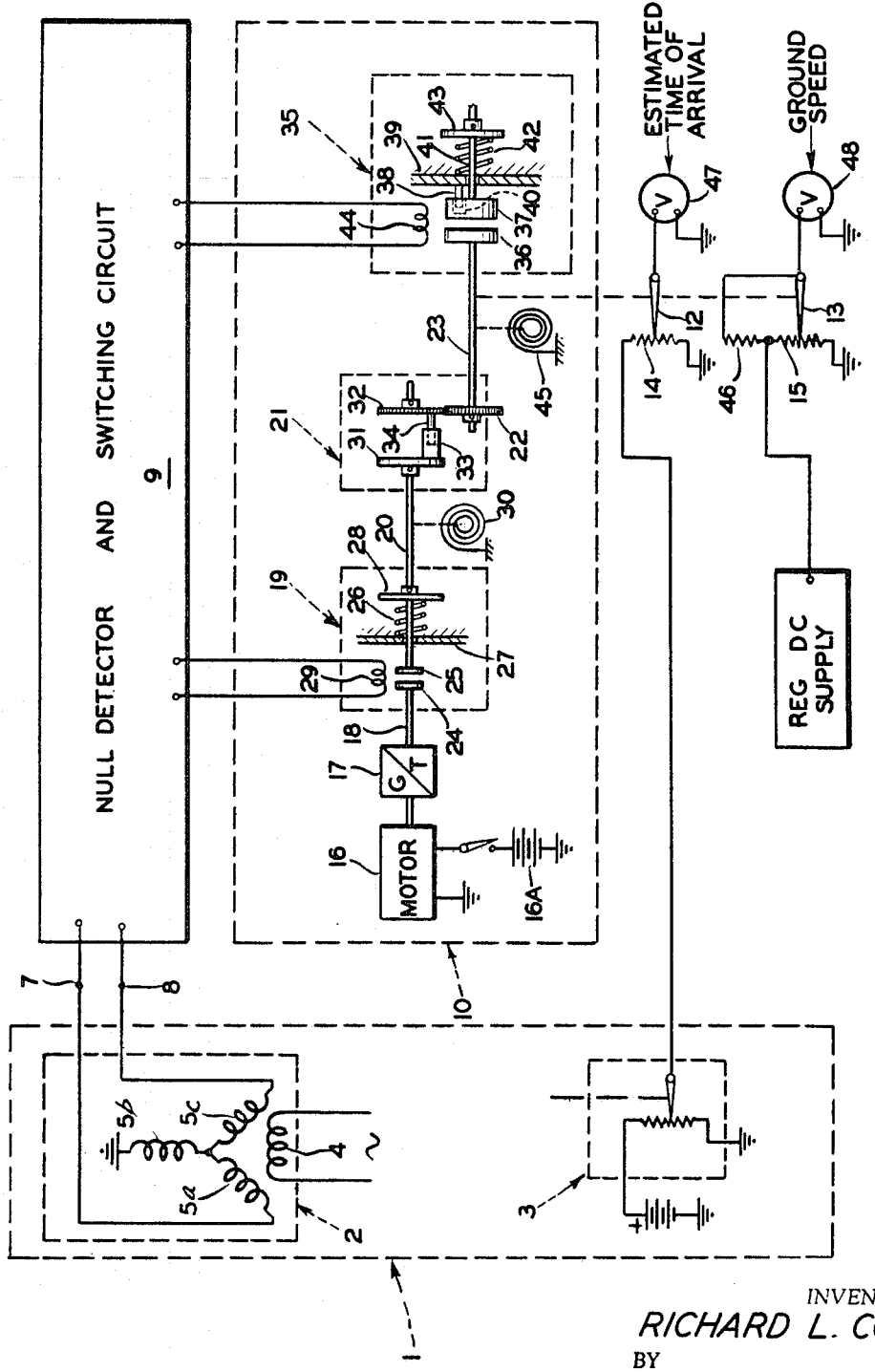
FIGURE 1 is a schematic diagram of one embodiment of the present invention.

Referring to FIGURE 1, a receiver 1 of conventional Tacan distance measuring equipment is shown. The operation of the distance measuring portion of a Tacan system is well known. Interrogating pulses are transmitted from an aircraft to a surface beacon. The surface beacon receives these pulses and transmits replies automatically over a ground to air channel. A receiver on the aircraft is tuned to this channel and by measuring the time elapsed between its transmitted pulse and the received reply, it computes the line of sight distance between itself and the surface equipment. The Tacan system may be of the type shown and described in an article "Principles of Tacan" by R. I. Cohen and S .H. Dodington, in Electrical Communication, volume 33, pages 11–25, March 1956, published by the International Telephone and Telegraph Corporation, New York, N.Y.

Of the several components included in a conventional Tacan receiver, only the unit's distance transmitter synchro shown at 2 and the distance potentiometer shown at 3 are of interest. As is well known, the unit's distance transmitter is used in conjunction with a tens distance transmitter and a hundreds distance transmitter to provide a visual indication of distance to a station. Potentiometer 3 provides an output signal which is proportional to the distance to a station.

The unit distance transmitter 2 comprises a rotor 4 energized from a suitable source of alternating current and adjustably positioned relative to stator windings 5a, 5b, and 5c so that the rotor 4 induces different voltages in the three stator windings 5a, 5b, and 5c which result in output signals between terminals 7, 8, and ground, dependent upon the position of the rotor 4. The output signal is continuous through a complete 180° cycle of rotation of rotor 4. At the 180° point, equal voltages are induced in the three stator windings resulting in a null at output terminals 7 and 8. The same occurs for each succeeding 180° cycle of rotation. Each 180° cycle of rotation of the rotor 4 of the unit's distance transmitter 2 corresponds to a five mile interval.

A null detector and switching circuit 9 is connected to output terminals 7 and 8 and is responsive to the null generated at five mile intervals by the receiver 1 to control mechanical memory unit 10. The memory unit 10 has a mechanical connection 11 with sliders 12 and 13 of potentiometers 14 and 15, respectively. The operation is such that at 10 mile intervals, the null detector and switching circuit 9 actuates the memory unit 10 to adjust the displacements of sliders 12 and 13 so that their displacements are proportional to the time it takes to fly the five mile interval most recently traversed.

It is to be understood that the distance interval of five miles between nulls is not a limitation on the scope of the present invention. Nulls may be received at a greater or lesser distance interval, e.g. by connecting the stator windings of the unit's transmitter 2 to the stator windings of a synchro motor and gearing another transmitter to the rotor of the synchro motor at a ratio equal to the desired adjustment period. This additional transmitter would be used to drive the null detector. This method could be used to give virtually any desired adjustment period.

The memory unit 10 includes a D.C. motor 16 normally continuously energized from a suitable source of direct current 16A and drivingly connected through gear train 17, shaft 18, magnetic friction clutch 19, shaft 20, one-way drive coupling 21, and gear 22 to an output shaft 23. Output shaft 23 is connected to mechanical linkage 11 for adjusting the slider arms 12 and 13 of potentiometers 14 and 15.

Magnetic friction clutch 19 includes motor driven clutch plate 24 integral with shaft 18 and output clutch plate 25 integral with shaft 20. A coiled compression spring 26 surrounds shaft 20 with one end abutting the surface of bearing member 27 and its opposite end engaging an annular stop 28 on shaft 20. The null detector and switching circuit 9 is arranged to selectively control energization of a clutch actuating coil 29 for controlling operation of the magnetic clutch 19 as hereinafter explained. Shaft 20 is mounted for axial movement by bearing member 27 to permit output clutch plate 25 to engage motor driven clutch plate 24 for frictional driving engagement. The magnetic clutch 19 is spring biased to an open position by spring 26 when coil 29 is not energized.

A spring reset 30 is connected to shaft 20 and opposes angular displacement thereof. The spring reset 30 is adapted to return shaft 20 to its initial angular position after clutch 19 is deenergized.

One-way drive coupling 21 comprises a driving disc 31 fixedly connected to shaft 20 and a driven gear 32 having engageable projections 33 and 34, providing a driving connection in only one direction. The arrangement is such that the displacement of discs 31 and 32 will not exceed 330°. When disc 31 is driven by motor 16, projection 33 is capable of engaging projection 34 and driving gear 32. When disc 31 is returned to its initial position by spring reset 30, projection 33 moves free of projection 34 permitting disc 31 to return to its initial position without affecting the position of gear 32.

A magnetic friction slip brake 35 is connected to output shaft 23 and functions to maintain output shaft 23 in a displaced position after disc 31 of one-way drive coupling 21 is returned to its initial position. The magnetic friction slip brake 35 includes a plate 36 which is secured to and driven along with output shaft 23. A brake plate 37 is provided and adapted to frictionally engage plate 36. Brake plate 37 is fixed against rotation by a pin 38 secured to bearing member 39 and extending through an aperture 40 in disc 37. A shaft 41, extending through bearing member 39, supports brake plate 37 for axial movement. A coiled compression spring 42 surrounds shaft 41 with one end abutting the surface of bearing member 39 and its opposite end engaging an annular stop 43 on shaft 41. The null detector and switch circuit 9 is also arranged to selectively control energization of a brake actuating coil 44 for controlling operation of the magnetic brake 35 as hereinafter explained. Magnetic brake 35 is spring biased to an open position when coil 44 is deenergized.

When output shaft 23 is driven, the magnetic brake 35 slips. When disc 31 of one-way drive coupling 21 returns to its initial position, the magnetic brake 35 holds output shaft 23 in its displaced position.

A spring reset 45 is connected to output shaft 23 and opposes angular displacement thereof. Spring reset 45 is adapted to return output shaft 23 to a smaller angular displacement under certain conditions to be described further on in the specifications.

The operation of the memory unit 10 will now be described, with reference being made to FIGURE 1.

Motor 16 of adjustment unit 10 is continuously energized. Initially, there is no adjustment of potentiometers 14 and 15 because clutch 19, which couples motor 16 to potentiometers 14 and 15, is deenergized by null detector and switching circuit 9. Magnetic brake 35, which is connected to output shaft 23 of adjustment unit 10, is initially and normally energized by switching circuit 9.

In response to a first null, the null detector and switching circuit 9 energizes magnetic clutch 19 and maintains it in an energized condition for the subsequent five mile interval. During this interval, motor 16 is drivingly connected through gear train 17, shaft 18, magnetic clutch 19, shaft 20, unidrive 21, gear 22, output shaft 23, and mechanical linkage 11 to the sliders 12 and 13 of potentiometers 14 and 15. The rotation of shaft 20 and output shaft 23 is in opposition to spring resets 30 and 45, respectively. Magnetic brake 35 slips while output shaft 23 is driven.

At the end of the five mile interval following the first null, the displacements of slider arms 12 and 13 of potentiometers 14 and 15 are proportional to the time it takes the aircraft to fly five miles. The null detector and switching circuit 9 responds to a second null by momentarily deenergizing the magnetic brake 35. At this point, deenergization of magnetic brake 19 has no affect on the displacement of output shaft 23 as the latter is maintained in its displaced position by disc 31 and projection 33 of one-way drive coupling 21. After the magnetic brake 35 is again energized by switching circuit 9, the magnetic clutch 19 is deenergized by switching circuit 9. Disc 31 of one way drive coupling 21 is then returned to its initial position by spring reset 30 while disc 32 of one-way drive coupling 21 and output shaft 23 are held in a displaced position by magnetic brake 35 thereby maintaining the sliders 12 and 13 of potentiometers 14 and 15 in a displaced position proportional to the time it takes to fly a five mile interval.

During the five mile interval following the second null, the null detector and switching circuit 9 maintains magnetic clutch 19 in a deenergized condition and magnetic brake 35 in an energized condition. Thus, no adjustment is made during this interval.

In response to a third null, the null detector and switching circuit 9 again energizes magnetic clutch 19 and maintains it in an energized condition for the five mile interval following the third null. The magnetic brake 35, as in the case of the first null, is not affected by the third null and remains energized.

During the five mile interval following the third null, motor 16 drives shaft 20 and disc 31 on one-way coupling 21 through an angular displacement which may be greater or lesser than the angular displacement through which it was initially driven following the first null. The extent of the displacement of the disc 31 will vary with the time it takes to fly the five mile interval following the third null.

At the end of the five mile interval following the third null, if the angular displacement of disc 31 is greater than it was initially driven following the first null, it will drive output shaft 23 to a larger angular displacement through gears 32 and 22.

Output shaft 23 also adjusts to a smaller angular displacement if, at the end of the five mile interval following the third null, disc 31 is displaced through an angle less than is was initially driven following the first null. The return of output shaft 23 to a smaller angular displacement is initiated by the fourth null. In response to the fourth null, the null detector and switching circuit 9 momentarily deenergizes magnetic brake 35. Spring reset 45 will return output shaft 23 to a smaller angular displacement until projection 34 engages projection 33.

After the magnetic brake 35 is again energized, the magnetic clutch 19 is deenergized by switching circuit 9 and disc 31 is again returned to its initial position by spring reset 30. Output shaft 23 is held in a displaced position by magnetic brake 35. Magnetic clutch 19 remains deenergized for the five mile interval following the fourth null, as was the case following the second null.

The computer responds to the fifth null as it did to the third null and to the sixth null as it did for the fourth null and the operation is repeated in the same manner for subsequent nulls. Thus, at 10 mile intervals, output shaft 23 of adjustment unit 11 is adjusted to a displacement proportional to the time it takes to fly the five mile interval most recently traversed.

Potentiometers 14 and 15 are connected to the output shaft 23 by mechanical linkage 11 and their outputs are, thereby, adjusted at five mile intervals so as to be proportional to the time it takes to fly a recent five mile interval.

Estimated time of arrival information is derived by exciting potentiometer 14 with the output from distance potentiometer 3 in receiver 1 which output is proportional to the distance to go.

Groundspeed information is derived by exciting potentiometer 15 from a regulated direct current supply. A resistor 46 is shunted across potentiometer 15 to linearize its output.

Indicators 47 and 48 are connected to the outputs from potentiometers 14 and 15 to provide a visual indication of estimated time of arrival and average groundspeed. Indicators 47 and 48 are conventional voltmeters scaled to provide the desired information.

Figure 2:
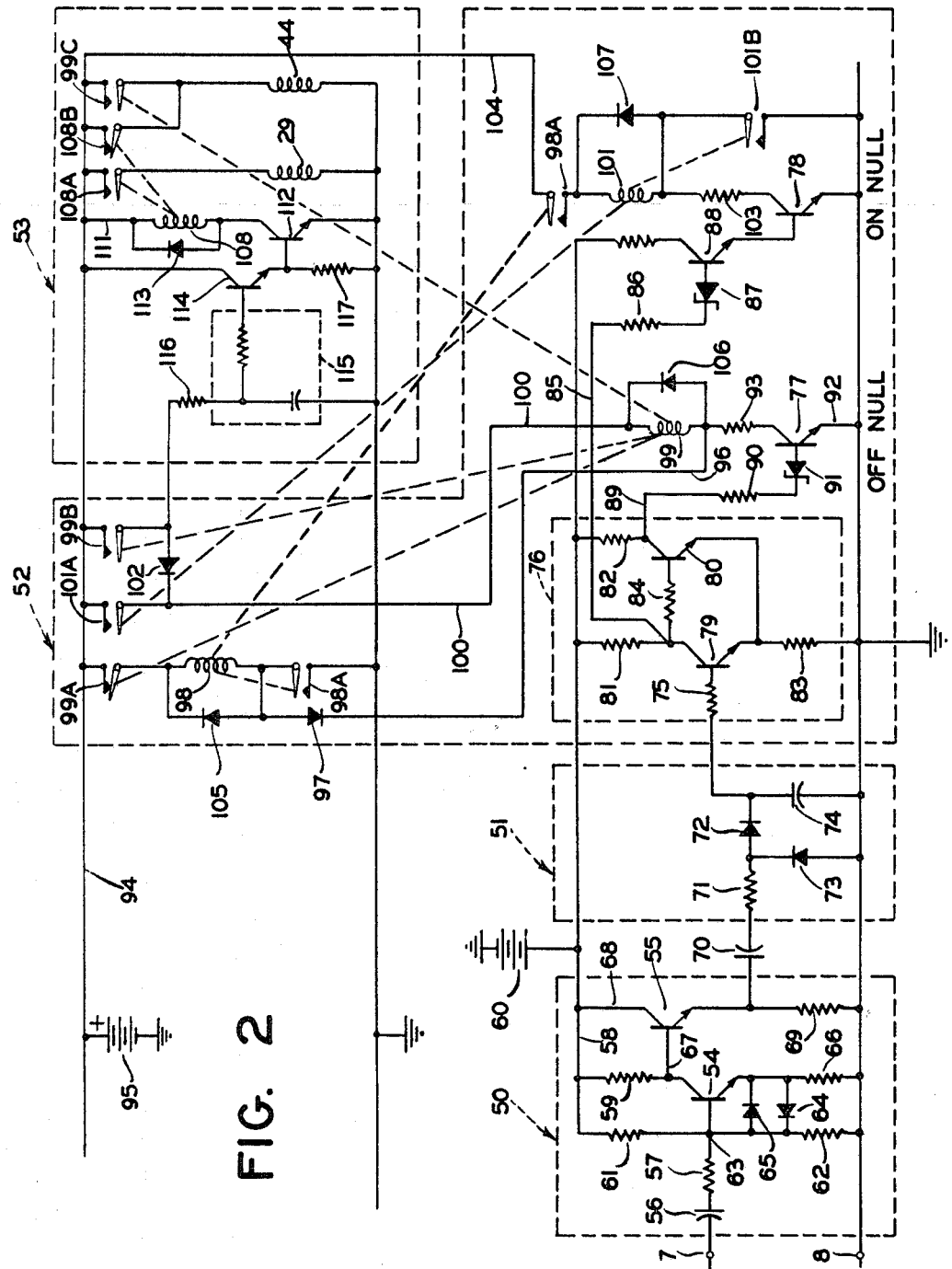
FIGURE 2 is a circuit diagram of the null detector and switching circuitry of the present invention.

Referring to FIGURE 2, the null detector and switching circuit is shown as being connected to output terminals 7 and 8 or receiver 1 and as comprising an amplifying network 50, rectifying network 51, switching network 52 and a clutch and brake energizing network 53.

Amplifying network 50 is connected to the output terminals 7 and 8 of receiver 1. Amplifier 50 comprises a pair of amplifying transistors 54 and 55. Transistors 54 and 55 are junction transistors of the NPN type.

The signal from receiver 1 is fed through output terminal 7, capacitor 56, resistor 57 to the base of transistor 54. Output terminal 8 from receiver 1 is connected to ground. The collector of transistor 54 is connected to power supply line 58 by resistor 59. Power supply line 58 is connected to the positive terminal of battery 60. Resistors 61 and 62 form a voltage divider network with resistor 61 connected to the power supply line 58 and resistor 62 connected to ground. Junction 63 of resistors 61 and 62 is connected to the base of transistor 54 thereby establishing a quiescent operating point for transistor 54. Diodes 64 and 65, connected across the base emitter circuit of transistor 54, function to limit the base emitter voltage of transistor 54 to a maximum permissible value. Resistor 66 connects the emitter of transistor 54 to ground and functions to temperature stabilize transistor 54.

The output from transistor 54 is taken from its collector and fed directly to the base of transistor 55 by a conductor 67. The collector of transistor 55 is connected to power supply line 58 by a conductor 68. The emitter of transistor 55 is connected to ground by resistor 69. Transistor 55 is connected in the common collector configuration and has a high input impedance and low output impedance. In addition to amplifying the signal applied thereto, it functions to allow coupling from the high impedance collector circuit of transistor 54 to the low impedance input of switching circuitry 52.

The output from amplifier 50 is fed to the rectifier network 51 by coupling capacitor 70 and resistor 71. Rectifier network 51 includes a rectifying diode 72 which will only pass signals of positive polarity. In order to protect diode 72 from reverse voltage breakdown, a diode 73 shunts the input to ground when a reverse voltage is applied. This results in a large voltage drop across resistor 71, a small drop across diode 73, which causes a small drop across diode 72 and transistor 79. The rectified output voltage from diode 72 is shunted to ground by a capacitor 74 in order to smooth the pulsating output from diode 72.

The output from rectifying network 51 is fed to switching network 52 by resistor 75. The switching network includes a Schmitt trigger 76 and switching transistor 77 and 78.

Schmitt trigger network 76 comprises two NPN transistors 79 and 80 connected in the common emitter configuration. The collectors of transistors 79 and 80 are connected to the power supply line 58 and the positive terminal of battery 60 by resistors 79 and 80 are both connected to ground by a common resistor 83. The output from the collector of transistor 79 is directly coupled to the base of transistor 80 by resistor 84.

Under normal operating conditions, a positive signal is fed by rectifying network 51 to the base of tarnsistor 79 thereby driving transistor 79 into a state of conduction. The potential existing at the collector of transistor 79 is applied to the base of transistor 80 by resistor 84. When transistor 79 is conducting, its collector is at a relatively low potential. In this latter condition, the potential applied to the base of transistor 80 is not high enough in the positive direction to establish forward bias and transistor 80 is thereby cutoff.

At five mile intervals, the signal output from rectifying network 51 will momentarily null. At this point, transistor 79 will no longer be forwardly biased and current flow therein decreases. The voltage at the collector of transistor 79 rises and approaches the positive voltage of battery 60. This positive voltage is coupled to the base of transistor 80 establishing forward bias thereby rendering it conductive. Current flows from ground through resistor 83 to the emitter of transistor 80. The voltage drop across resistor 83 maintains transistors 79 at cutoff.

Transistor 80 remains in a conducting condition only for the brief instant during which a null is applied to the base of transistor 79. A positive signal is again applied to the base of transistor 79 establishing forward bias and rendering it conductive. This causes collector voltage of transistor 79 to decrease thereby driving transistor 80 through resistor 84 into a cutoff condition. In turn, the voltage drop across resistor 83 is lowered thereby increasing forward bias and current flow in transistor 79. Thus, transistor 79 is normally conducting, however, it is cutoff for a brief instant at five mile intervals during which period transistor 80 is rendered conductive.

The collector of transistor 79 is connected by conductor 85, resistor 86, Zener diode 87, and amplifying transistor 88 to the base of switching transistor 78. The collector potential of transistor 79 is determined by the voltage drop across resistor 83 when it is conducting and near the positive potential of battery 60 when it is cutoff.

When transistor 79 is conducting, the potential applied to Zener diode 87 is not sufficiently high in a positive direction to render it conductive. Thus, switching transistor 78 is cut off when transistor 79 is conducting. When transistor 79 is cut off, the voltage existing at the collector of transistor 79 is relatively high in a positive direction and capable of rendering Zener diode 87 and switching transistor 78 conductive. Thus, switching transistor 77 is rendered conductive when transistor 79 is cut off.

The collector of transistor 80 is connected by conductor 89, resistor 90, and Zener diode 91 to the base of switching transistor 77. The collector potential of transistor 80 is determined by the voltage drop across resistor 83 when it is conducting and it is near the positive potential of battery 60 when it is cut off.

When transistor 80 is cut off, a relatively high positive voltage is applied to Zener diode 91 and to the base of switching transistor 77 thereby rendering both conductive. When transistor 80 is conducting, the potential applied to Zener diode 91 is not sufficiently high in a positive direction to render it conductive. Switching transistor 77 is thus cut off when transistor 80 is conducting.

Switching transistor 77 is an NPN transistor connected in the common emitter configuration. The emitter of transistor 77 is connected to ground by conductor 92. The collector of transistor 77 is connected by resistor 93 through alternate paths to power supply line 94 which is, in turn, connected to the positive terminal of battery 95. One current path can be traced from the collector of switching transistor 77, through resistor 93, conductor 96, diode 97, coil 98 and normally closed magnetic switch 99A to the power supply line 94. A second path can be traced from the collector of switching transistor 77, through resistor 93, coil 99, conductor 100, normally open magnetic switch 101A to power supply line 94. A third path is similar to the second path differing only in that conductor 100 is connected to power supply line 94 by diode 102 and normally open magnetic switch 99B rather than switch 101A.

Switching transistor 78 is also an NPN transistor connected in the common emitter configuration. The emitter of transistor 78 is connected to ground. The collector of transistor 78 is connected to the power supply line 94 by resistor 103, coil 101, normally open magnetic switch 98A and conductor 104. A normally open magnetic switch 101B serves as a latching relay which allows the full supply voltage to maintain coil 101.

Energization of coil 98 closes switch 98A. Energization of coil 99 opens switch 99A and closes switch 99B. Energization of coil 101 closes switches 101A and 101B. Diodes 105, 106, 107, connected across coils 98, 99, and 101, respectively, serve to short out any transient voltage that would be induced in the coils during application or removal of power, thereby protecting their respective transistors.

The clutch and brake energizing circuit 53 includes a switch energizing coil 108, the clutch coil 29, and the brake coil 44. Coils 29 and 44 are connected to power supply line 94 by normally open magnetic switches 108A and 99C, respectively. Brake coil 44 is also connected to power supply line 94 through an alternate path including normally closed magnetic switch 108B. The opposite ends of coils 29 and 44 are connected to ground. A switch energizing coil 108 is connected to power supply line 94 by a conductor 111 and its opposite end is connected to ground by transistor 112. Coil 108 is energized when transistor 112 is rendered conductive. Diode 113 is connected across coil 108 and shorts out transients caused by energizing and deenergizing the coil, thereby protecting transistor 112.

The base of transistor 112 is connected to power supply line 94 by a transistor 114, an RC time delay network 115, a resistor 116, and switch 99B. The emitter of transistor 112 is connected to ground by conductor 118. The transistor 114 permits a large time constant (RC) to be obtained by using a large resistor and low current instead of a large capacitor. The small time delay current is then amplified by transistor 114. Resistor 116 acts as a current limiter to the base of transistor 114.

When switch 99B is closed, transistor 112 is forwardly biased and rendered conductive thereby energizing coil 108. The coil 108 will remain energized for a brief period following the opening of switch 99B due to time delay network 115. Energization of coil 108 closes magnetic switch 108A and opens magnetic switch 108B. Magnetic switch 99C is closed when coil 99 of switching circuit 52 is energized.

The operation of the null detector and switching circuit 9 will now be described. Initially, a signal is fed from receiver 1 through amplifier 50 to rectifier 51. The rectified signal from rectifier 51 is applied to the base of transistor 79 of trigger circuit 76 rendering transistor 79 conductive and transistor 80 cut off. As previously explained, when trigger circuit 76 is in this condition, switching transistor 77 is conducting and switching transistor 78 is cut off. The collector of conducting transistor 77 is connected to the power supply line 94 through resistor 93, conductor 96, diode 97, coil 98 and normally closed magnetic switch 99A.

During the initial interval, clutch energizing coil 29 is deenergized as its power supply line switch 108A is open.

In response to a first null, trigger circuit 76 goes to its second stable condition wherein transistor 80 is rendered conductive while transistor 79 is cut off. As previously explained, when trigger circuit 76 is in this condition, switching transistor 78 is rendered conductive while transistor 77 is cut off.

Switch 98A, through which the collector of switching transistor 78 is connected to power supply line 94, remains closed for a short period after switching transistor 77 is cut off, even though its energizing coil 98 is connected in the power supply line circuit of switching transistor 77. This is due to the transient voltage induced in coil 98 after removal of power.

The trigger circuit 76 remains in its new stable condition for the duration of the first null which is only a brief instant. When the first null ends (trigger circuit 76 reverts to its initial condition whereby switching transistor 78 is driven to cutoff and switching transistor 77 is rendered conductive. Now, however, the collector of switching transistor 77 is connected to power supply line 94 through coil 99, conductor 100 and switch 101A. Switch 101A remains closed for a short time after switching transistor 78 is cut off even though its energizing transistor 78. This is due to the transient voltage induced in coil 101 after removal of power.

Energization of coil 99 opens normally closed contacts 99A thereby breaking one of the circuits between the collector of transistor 77 and power supply line 94. Switch 101A is also opened after a brief period due to deenergization of coil 101 thereby breaking a second circuit line 94. However, before coil 101 is deenergized, the energization of coil 99 closes contacts 99B thereby establishing an alternate path for connecting the collector of transistor 77 to the power supply line 94. The alternate path comprises resistor 93, coil 99, conductor 100, diode 102 and switch 99B. The switching circuit 52 remains in this condition until a second null is applied which will be after a five mile interval following the first null.

Brake coil 44 in the brake and clutch energizing circuit 53 is connected to power supply line 82 through switch 99C. Switch 99C is maintained closed by coil 99 and thus, the magnetic brake 44 in memory unit 10 is energized during the five mile interval following the first null.

The clutch coil 29 is also closed during the five mile interval following the first null. When switch 99B is closed, the base of transistor 112 is connected to the power supply line 94 through transistor 114, an RC delay network 115, resistor 116, and switch 99B. The potential applied to the base of transistor 112 renders it conductive and switch energizing coil 108 is energized. Energization of coil 108 closes switch 108A thereby connecting clutch coil 29 to power supply line 94.

A second null occurs five miles after the first null. Switching transistor 77 is driven to cutoff in the same manner as when the first null occurred. Coil 99 is deenergized, switches 99B and 99C are opened, and switch 99A is closed. The switch energizing coil 108 remains energized for a brief period governed by the time constant of time delay network 115, thereby briefly maintaining normally open switch 108A closed and normally open switch 108B closed. This results in brief deenergization of brake coil 44 as both switches 99C and 108B are open. During this brief period, clutch coil 29 remains energized as switch 108 is closed.

When coil 108 is finally deenergized, brake coil 44 is again energized as normally closed switch 108 B is closed when its actuating coil 108 is deenergized. The clutch energizing coil 29 is deenergized following deenergization of coil 108 due to the opening of switch 108A. The circuit remains in this condition during the five mile interval following the second null.

Switching transistor 78 does not respond to the second null as it did to the first null as switch 98A is open when the second null occurs. Thus, coil 101 is not energized and its associated switch 101A remains open.

After the second null, switching transistor 77 is again rendered conductive. Since switch 101A is open, the collector of transistor 77 is connected to power supply line 94 through resistor 93, conductor 96, diode 97, and coil 98 and normally closed contacts 99A.

The operation in response to the third and fourth nulls is the same as that occurring in response to the first and second nulls respectively and the operation is repeated in the same manner for subsequent nulls.

Briefly summarizing, initially only brake coil 44 is energized by its connection to the power supply line 94 through normally closed switch 108B. In response to the first null, the clutch coil 29 is energized and brake coil 44 is maintained in an energized condition. During the five mile interval following the first null, the clutch coil 29 and brake coil 44 remain energized. In response to the second null, brake coil 44 is deenergized briefly and then, reenergized while the clutch coil 29 is deenergized. During the five mile interval following the second null, brake coil 44 remains energized while clutch coil 29 remains deenergized. When the third null occurs, the brake coil 44 remains energized and the clutch coil 29 is energized. This operation is identical to the operation following the first null. The operation following the fourth null is identical to the operation following the second null. The operation in response to subsequent nulls is similarly repeated.

Figure 3:
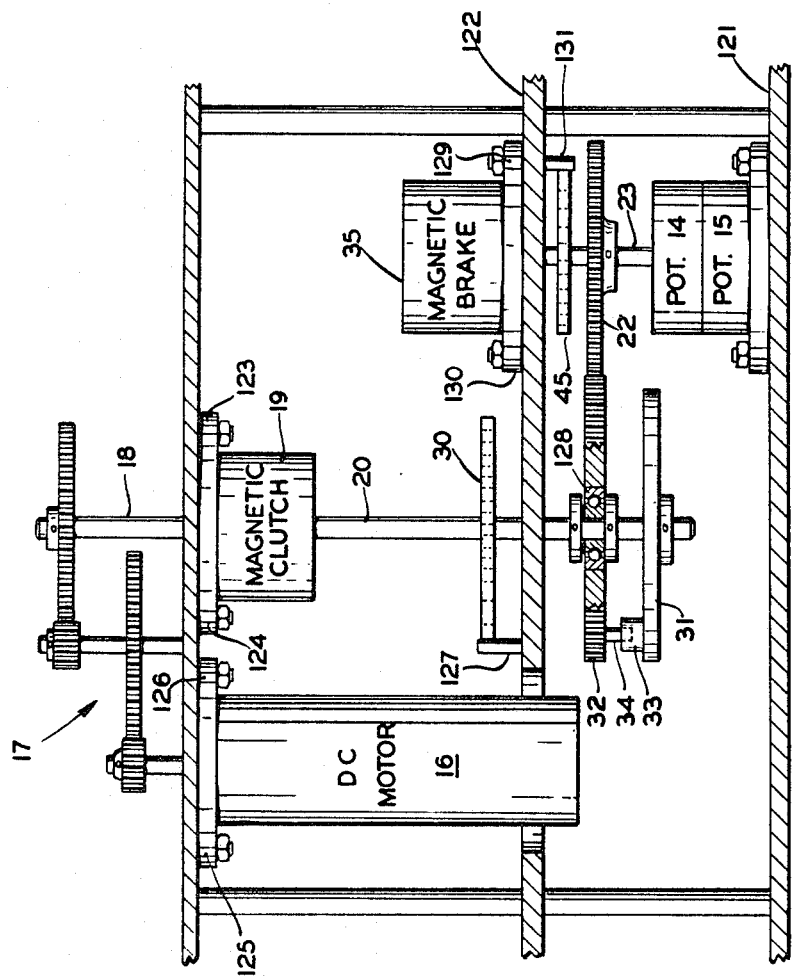
FIGURE 3 is a view of the mechanical memory portion of the computer system which is utilized to compensate for changes in average groundspeed.

Referring to FIGURE 3, adjustment unit 10 is shown including a top plate 120, bottom plate 121 and intermediate support plate 122. The magnetic clutch 19 has outwardly extending flanges 123 and 124 for mounting the clutch on the bottom surface of top plate 120. The shaft 18 extends from magnetic clutch 19 through an aperture in top plate 120. The constant speed D.C. motor 16, having outwardly extending flanges, 125 and 126, for mounting the motor on the bottom surafce of top plate 120, is drivingly connected to shaft 18 through gearing 17. Motor 16 is normally energized and shaft 18 is continuously driven when the present invention is in operation.

When clutch 19 is energized, shaft 20, extending downwardly from magnetic clutch 19, is coupled to shaft 18 and driven thereby. When clutch 19, is deenergized, shaft 20 is returned to its initial position by coil spring 30. Coil spring 30 is wound around shaft 20 and has one end connected to shaft 20 and its other end connected to lug 127 projecting upwardly from intermediate support plate 122.

Shaft 20 has drive disc 31 fixedly connected thereto. Driven gear 32 is also mounted on shaft 20 in spaced parallel relation to drive disc 31. Gear 32 is rotatably journaled on shaft 20 by a bearing 128. A lug 33 is integral with disc 31 and extends upwardly from its upper surface. Lug 33 is adapted to engage a lug 34 integral with gear 32 and projecting downwardly from its bottom surface. Lugs 32 and 33 provide a one-way drive connection between drive disc 31 and driven gear 32.

Magnetic brake 35 has outwardly extending flanges 129 and 130 for mounting the magnetic brake 35 onto the top surface of intermediate support plate 122. Output shaft 23 is connected to magnetic brake 35 and extends through an aperture in intermediate support plate 122. Gear 22 is fixedly secured to output shaft 23 and is in driving engagement with driven gear 32. A coil spring 45 is mounted on shaft 23 and with one end connected to shaft 23 and its opposite end connected to a lug 131 projecting downwardly from the bottom surface of intermediate support plate 122. When brake 35 is deenergized, spring 45 is capable of returning shaft 23 to a smaller angular displacement until lugs 33 and 34 engage.

The potentiometer 15 has its adjuastable arm 13 connected by conventional means to output shaft 23 for adjusting the output of potentiometer 15 so that the voltage output of potentiometer 15 is proportional to the displacement of output shaft 23 to effect the groundspeed indication through voltmeter 48 as heretofore explained. The potentiometer 14 also has its adjustable arm 12 connected to the output shaft 23 to effect the estimated time of arrival indication through the voltmeter 47 as heretofore explained.

*Operation*

The operation of the present invention should be readily understood from the above detailed description. In summary, the operation will now be briefly described with reference being made to FIGURE 1.

A null is deprived from Tacan receiver 1 at five mile intervals. In response to a first null, null dectector and switching circuit 9 energizes a magnetic clutch 19 in adjustment unit 10. Magnetic clutch 19 couples a continuously energized motor 16 to the output shaft 23 of adjustment unit 10 through means including a shaft 20 and one-way drive coupling 21. Shaft 20 turns, winds a spring reset 30 connected thereto, and drives output shaft 23 to an angle, which for purposes of example, will be called θ. A magnetic brake 35, connected to output shaft 23, slips when output shaft 23 is driven to angle θ. At the end of the five mile interval following the first null, output shaft 23 and the slider arms of potentiometers 14 and 15 connected to output shaft 23 are displaced through an angle θ which is proportional to the time it took to fly the five miles.

In response to a second null, null detector and switching circuit 9 momentarily deenergizes the clutch 19 and shaft 20 is returned to its initial zero position by reset spring 30. Meanwhile, the magnetic brake 35 maintains output shaft 23 in its displaced position.

In response to a third null, output shaft 23 is again driven to an angle which may be larger or smaller than θ depending on the time it takes to fly the five mile interval following the third null. If shaft 20 is driven to an angle larger than θ, output shaft 23 is correspondingly driven to this larger angle. If shaft 20 is driven to a smaller angle, the null detector and switching circuit 9, in response to a fourth null, deenergizes the magnetic brake 10 connected to output shaft 23. The spring reset 45 connected to the output shaft 23 then returns shaft 23 to this smaller angle until 33 and 34 engage. The magnetic brake 35 is again energized and magnetic clutch 19 is again deenergized to return shaft 20 to a position of zero displacement.

The operation in response to the fifth null and sixth null is the same as that occurring in response to the third and fourth nulls and the operation is repeated in the same manner for subsequent nulls.

The output shaft 23 and potentiometers 14 and 15 connected thereto are thus adjusted every ten miles to make their displacements correspond with the time it takes to fly the most recent five mile interval. Estimated time of arrival information is derived by exciting the potentiometer 14 with the output from a distance potentiometer included in receiver 1. Groundspeed information is derived by exciting the potentiometer 15 from a regulated D.C. supply.

Although only one embodiment of the invention has been illustrated and described, various changes in the form and relative arrangements of the parts, which will now appear to those skilled in the art may be made without departing from the scope of the invention. Reference

What is claimed is:

1. Apparatus for aircraft comprising a drive means, a magnetic clutch connected to said drive means, a one-way drive connection, coupling means connecting said magnetic clutch to said one-way drive connection, reset means for returning said driven means from a displaced position to a position of lesser displacement, a driven means connected to said one-way drive connection, reset means for returning said driven means from a displaced position to a position of lesser displacement, a magnetic brake means for maintaining said driven means in a displaced position, signal generating means for generating a signal proportional to the displacement of said driven means, distance measuring means, means for deriving null signals from said distance measuring means at predetermined distance intervals, circuit means including means responsive to said null signals for alternately energizing and deenergizing said magnetic clutch, and said circuit means including further means for momentarily deenergizing said magnetic brake prior to deenergization of said magnetic clutch.

2. Apparatus for an aircraft comprising distance measuring means for providing a signal proportional to the distance to a destination, signal means responsive to the output of said distance measuring means for providing a signal proportional to estimated time of arrival of said aircraft at said destination, and adjustment means for adjusting said signal means in accordance with the average speed during a distance increment to compensate for changes in groundspeed.

3. A computer for averaging the speed of an aircraft comprising signal means for providing a signal proportional to the time it takes said aircraft to fly a predetermined increment of the distance to its destination, adjustment means for periodically adjusting said signal means to compensate for changes in groundspeed in succeeding increments, and means responsive to said signal for indicating average groundspeed.

4. A computer for averaging the speed of an aircraft comprising signal means for providing a signal proportional to the time it takes said aircraft to fly a predetermined increment of the distance to its destination, adjustment means for periodically adjusting said signal means to compensate for changes in ground speed in succeeding increments, wherein said signal means includes constant speed driving means, displacable means, means for connecting said constant speed driving means to said displaceable means during said increments, and means connected to the displaceable means for providing signals proportional to the displacements of said displaceable means.

5. Apparatus for aircraft comprising first and second members, means connecting said first and second members, a constant speed drive means, clutch means connecting said constant speed driving means to said first member, control means for engaging said clutch means during a predetermined distance interval whereby said second member is displaced through a displacement proportional to the time it takes the aircraft to fly said predetermined distance interval, spring reset means connected to said first and second members, brake means connected to said second member, and said control means including means for selectively engaging and disengaging said clutch means and said brake means whereby the displacement of said member is adjusted to compensate for changes in groundspeed.

6. Apparatus as defined by claim 5 including distance measuring means having means for providing null signals at predetermined distance intervals, and said control means being responsive to said null signals for adjusting the displacement of said second member.

7. A speed measuring device for an aircraft, comprising means for providing a signal corresponding to the present distance of the craft from a destination, means connected to the distance signal means and responsive to the distance signal for providing signals when the craft travels predetermined increments of the total distance to be travelled, and means connected to the increment distance measuring means and responsive to the increment signals therefrom for providing an output corresponding to the average speed of the craft while traversing a distance increment.

8. A device for indicating ground speed and estimated time of arrival of a craft at a destination, comprising means for providing a signal corresponding to the present distance of the craft from a destination, means connected to the distance signal means and responsive to the distance signal for providing signals when the craft travels predetermined increments of the total distance to be traveled, means connected to the increment distance measuring means and responsive to the signals therefrom for providing an output corresponding to the average speed of the craft while traversing a distance increment, and indicating means operated by the speed averaging means and indicating the ground speed and the estimated time of arrival of the craft.

9. A device as described in claim 8 in which the indicating means for indicating the estimated time of arrival includes variable means connected to the distance signal means and energized by a voltage corresponding to the distance signal, the variable means being operated by the speed averaging means and adjusting the voltage in accordance with average speed during a distance increment and the indicating means being responsive to the adjusted voltage.

References Cited

UNITED STATES PATENTS

| | | | |
|---|---|---|---|
| 2,459,399 | 1/1949 | Wight et al. | 235—150.22 |
| 2,500,545 | 3/1950 | Herbst | 235—150.23 |
| 2,646,924 | 7/1953 | Schuck | 235—150.23 |
| 2,766,953 | 10/1956 | Cummings | 244—77 |
| 2,992,558 | 7/1961 | Newell et al. | 235—150.23 |
| 3,096,433 | 7/1963 | Daspit et al. | 235—150.23 |
| 3,115,319 | 12/1963 | Glaser et al. | 244—77 |

MARTIN P. HARTMAN, *Primary Examiner.*

U.S. Cl. X.R.

343—107; 244—77; 73—178